(12) United States Patent
Augst

(10) Patent No.: US 12,709,264 B2
(45) Date of Patent: Aug. 18, 2026

(54) METHOD AND SYSTEM FOR HANDLING A SITUATION RELATING TO A VEHICLE AND/OR A THIRD PARTY

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 274 days.

(21) Appl. No.: 18/016,039

(22) PCT Filed: Jun. 21, 2021

(86) PCT No.: PCT/EP2021/066800
§ 371 (c)(1),
(2) Date: Jan. 13, 2023

(87) PCT Pub. No.: WO2022/012870
PCT Pub. Date: Jan. 20, 2022

(65) Prior Publication Data

US 2023/0271606 A1 Aug. 31, 2023

(30) Foreign Application Priority Data

Jul. 15, 2020 (DE) ..................... 10 2020 118 615.0

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 50/087* (2013.01);
(Continued)

(58) Field of Classification Search
CPC .......... B60T 8/17558; B60T 2201/024; B60W 30/09; B60W 10/20; B60W 30/095;
(Continued)

(56) References Cited

U.S. PATENT DOCUMENTS 5,195,606 A 3/1993 Martyniuk
9,701,307 B1 * 7/2017 Newman ............. B60W 30/095
(Continued)

FOREIGN PATENT DOCUMENTS

CN 107010059 A 8/2017
CN 107792063 A 3/2018
(Continued)

OTHER PUBLICATIONS

Wang et al, "Crash Mitigation in Motion Planning for Autonomous Vehicles", published: Jan. 2019, publisher: IEEE, pp. 3313-3323 (Year: 2019).*

(Continued)

*Primary Examiner* — Wilson W Tsui
(74) *Attorney, Agent, or Firm* — Crowell & Moring LLP

(57) ABSTRACT

A method for handling a situation relating to a vehicle and/or a third party includes ascertaining or predicting a critical situation relating to the vehicle and/or the third party; detecting an object in the surroundings of the vehicle and/or the third party; and controlling the vehicle and/or the third party relative to the object or controlling the object relative to the vehicle and/or the third party such that in a first phase, a comparably rapid or accelerated approach is carried out between the vehicle and/or the third party and the object; in a second phase, a comparably slow or decelerated approach is carried out between the vehicle and/or the third party and the object; and in a third phase, a contact is produced between the vehicle and/or the third party and the object.

12 Claims, 1 Drawing Sheet

(51) Int. Cl.
*B60W 50/08* (2020.01)
*B60W 50/10* (2012.01)

(52) U.S. Cl.
CPC ......... *B60W 50/10* (2013.01); *B60W 2720/10* (2013.01); *B60W 2720/106* (2013.01)

(58) Field of Classification Search
CPC ........... B60W 30/0956; B60W 50/087; B60W 50/10; B60W 2720/10; B60W 2720/106
See application file for complete search history.

(56) References Cited

U.S. PATENT DOCUMENTS

| | | | | |
|---|---|---|---|---|
| 2004/0030498 | A1 | 2/2004 | Knoop et al. | |
| 2015/0232090 | A1* | 8/2015 | Jeon | B60W 50/14 701/1 |
| 2016/0001781 | A1* | 1/2016 | Fung | G07C 9/37 701/36 |
| 2016/0207530 | A1* | 7/2016 | Stanek | B60W 10/20 |
| 2016/0229397 | A1* | 8/2016 | Muthukumar | B60W 10/04 |
| 2017/0066449 | A1* | 3/2017 | Lee | B60W 10/184 |
| 2017/0217431 | A1 | 8/2017 | Class et al. | |
| 2018/0065626 | A1 | 3/2018 | Reckziegel et al. | |
| 2018/0362028 | A1* | 12/2018 | Prokhorov | B62D 15/0255 |
| 2019/0143964 | A1 | 5/2019 | Zuckerman et al. | |
| 2019/0259283 | A1 | 8/2019 | Sung et al. | |
| 2019/0276012 | A1 | 9/2019 | Zhu et al. | |
| 2020/0139960 | A1 | 5/2020 | Newman et al. | |
| 2020/0189573 | A1* | 6/2020 | King | B60R 21/0134 |

FOREIGN PATENT DOCUMENTS

| | | | |
|---|---|---|---|
| CN | 110182204 | A | 8/2019 |
| CN | 110462703 | A | 11/2019 |
| DE | 10 2005 054 754 | A1 | 5/2007 |
| DE | 10 2006 026 370 | A1 | 12/2007 |
| DE | 10 2008 005 310 | A1 | 7/2009 |
| DE | 10 2009 013 564 | A1 | 11/2009 |
| DE | 10 2013 206 915 | A1 | 10/2014 |
| DE | 10 2017 209 533 | A1 | 12/2018 |
| DE | 10 2017 215 211 | A1 | 2/2019 |
| DE | 10 2018 112 518 | A1 | 11/2019 |
| EP | 2 482 026 | A2 | 8/2012 |
| JP | 2005-313708 | A | 11/2005 |
| WO | WO 03/006288 | A1 | 1/2003 |
| WO | WO 2006/045259 | A1 | 5/2006 |
| WO | WO 2009/092374 | A1 | 7/2009 |
| WO | WO 2011/101014 | A1 | 8/2011 |

OTHER PUBLICATIONS

Lu et al, "Multiple-Vehicle Longitudinal Collision Mitigation by Coordinated Brake Control", published: Sep. 2014, pp. 1-13). (Year: 2014).*

Witteman, "Improved vehicle crashworthiness design by control of the energy absorption for different collision situations", published: 1999, publisher: Technische Universiteit Eindhoven, pp. 1 and 30-34 (Year: 1999).*

International Search Report (PCT/ISA/210) issued in PCT Application No. PCT/EP2021/066800 dated Sep. 30, 2021 with English translation (six (6) pages).

German-language Written Opinion (PCT/ISA/237) issued in PCT Application No. PCT/EP2021/066800 dated Sep. 30, 2021 (seven (7) pages).

German-language Search Report issued in German Application No. 10 2020 118 617.7 dated Jan. 12, 2021 with partial English translation (13 pages).

German-language Search Report issued in German Application No. 10 2020 118 616.9 dated Jan. 12, 2021 with partial English translation (13 pages).

German-language Search Report issued in German Application No. 10 2020 118 615.0 dated Jan. 12, 2021 with partial English translation (13 pages).

Chinese-language Office Action issued in Chinese Application No. 202180061118.3 dated Apr. 27, 2025 with partial English translation (26 pages).

Chinese-language Notice of Grant issued in Chinese Application No. 202180061118.3 dated Sep. 25, 2025 (5 pages).

* cited by examiner

1'
1
2'
2'
3

1
2
3

1
2
3

1
2
3

METHOD AND SYSTEM FOR HANDLING A SITUATION RELATING TO A VEHICLE AND/OR A THIRD PARTY

BACKGROUND AND SUMMARY OF THE INVENTION

In the prior art, devices and systems are known which, in preparation for a possibly unavoidable collision, automatically intervene in the control of a vehicle to avoid a collision and/or intervene to reduce the accident severity caused by the collision. In some cases, the intervention is preceded by a warning to the driver to motivate him to intervene manually. In the event that there is no reaction or a delayed reaction on the part of the driver, appropriate measures are initiated.

It is typically assumed that both the vehicle and the driver are in a state that allows an intervention. In some cases, it is at least assumed that the technical equipment (for example the braking system) of the vehicle is free of defects in order to compensate for a lack of reaction by the driver or to mitigate its consequences.

The publication DE 10 2005 054754 describes a method for determining the time for the initiation of a necessary braking intervention for a motor vehicle in order to avoid a collision with a detected object driving ahead or located ahead, wherein the necessary braking intervention may be carried out manually or automatically and wherein the time at which the braking intervention is initiated is determined depending on a predetermined, expected braking deceleration of the motor vehicle during the braking intervention. The expected braking deceleration is determined in such a way that, in the presence of a currently determined coefficient of friction, a braking deceleration reduced compared to a defined maximum deceleration depending on this friction coefficient is specified and that, in the absence of a currently determined coefficient of friction, a braking deceleration increased relative to the last specified reduced braking deceleration is specified.

The publication WO 2003/006288 A1 describes a method and a device for the prediction of movement trajectories of a vehicle to prevent or reduce the consequences of an imminent collision, with which for prediction of the trajectories of movement only those trajectories are taken into account with which, as a result of a combination of steering and braking interventions, the forces applied to the wheels of the vehicle are within the range corresponding to the maximum force transmissible from the wheel to the road. In particular, with systems involving automatic braking and/or steering intervention to avoid a collision or to reduce the severity of an accident with other objects, an automatic braking and/or steering intervention takes place depending on the precalculated trajectories of movement.

The publication WO 2006/045259 A1 describes a method for improving the safety and/or reducing the consequences of accidents of road users involved in an accident detected in advance by a motor vehicle, in which the motor vehicle carries out the steps of the method: determination of vehicle information of the motor vehicle; detecting the surroundings of the motor vehicle; determination of environmental information about road users in the surroundings of the motor vehicle from the detected surroundings; calculation of at least one unavoidable accident from the environmental information and vehicle information according to an accident calculation algorithm; and initiating measures to reduce the consequences of accidents for and taking into account all road users directly and indirectly involved in an unavoidable accident.

The publication U.S. Pat. No. 5,195,606 describes a device for emergency braking, which can bring a motor vehicle to a standstill by way of a manually triggered, automated control of the braking system of the vehicle. The manual triggering is carried out by the driver or a passenger of the vehicle by operating a corresponding switch and is intended for cases in which the driver is in a state in which he is no longer or only partially able to control or monitor the vehicle.

It is disadvantageous that a reduction in the speed of the vehicle that can be achieved solely by the frictional force between the vehicle tires and a typical road surface is often not sufficient to avert a collision or to mitigate the consequences of a collision, for example. Furthermore, it is disadvantageous that remaining kinetic energy of the vehicle not dissipated or not able to be dissipated by previous emergency braking is absorbed mainly by a collision (also called a "crash" in professional circles), i.e. a cold deformation of the vehicle and possibly other objects. This typically causes a very high level of damage. Furthermore, it is disadvantageous that during a (typically only very short-term) crash process no abort or effective intervention in the course thereof is possible.

It is an object of the present disclosure to provide a method and a system for handling a situation relating to a vehicle and/or a third party that avoid one or more of the described disadvantages and/or allow one or more of the described advantages.

This object is achieved by the subject matter of the claimed invention. It should be noted that additional features of a claim dependent on an independent claim without the features of the independent claim or only in combination with a subset of the features of the independent claim may constitute a separate invention that is independent of the combination of all features of the independent claim, which may be made the subject of an independent claim, a divisional application or a subsequent application. This applies in the same way to technical teachings described in the description, which may constitute an invention independent of the features of the independent claims.

A first aspect of the present disclosure proposes a method for dealing with a situation relating to a vehicle and/or a third party. The method includes ascertaining or predicting a critical situation relating to the vehicle and/or the at least one third party; and detecting at least one object in the surroundings of the vehicle and/or the at least one third party; and controlling the vehicle and/or the at least one third party relative to the object or controlling the at least one object relative to the vehicle and/or the at least one third party such that in a first phase an in particular comparatively rapid or accelerated approach is carried out between the vehicle and/or the at least one third party and the at least one object; in a second phase, an in particular comparatively slow or slowed down approach between the vehicle and/or the at least one third party and the at least one object is carried out; and in the third phase, contact between the vehicle and/or the at least one third party and the at least one object is carried out.

The critical situation (hereinafter also referred to as the "situation") can be a specific situation, for example it may be characterized by certain characteristics (for example a certain driving situation, arrangement of the road users)

and/or a situation exceeding a certain degree of criticality (for example a probability and/or possible consequences of an undesirable event).

In other words, the critical situation can be characterized by an extent of probability of damage and/or of damage exceeding a certain threshold. This may affect the vehicle and the third party. Also, this may essentially affect only the vehicle or the third party. In particular, the critical situation is a defined or specific critical situation. It may be a situation characterized by a certain type, class, and/or pattern.

The critical situation may be a very rare situation not known a priori or, based on existing parameters, a not yet or never before encountered type of the situation. The critical situation can mean, for example, that the criticality of a situation can be predicted even without knowing, measuring or being able to calculate the situation by computer, in particular parameters of the situation.

Preferably, a prediction of a critical situation can be carried out, for example, by way of an artificial intelligence and/or a correspondingly set up or trained neural network. In this case, too, the method can be carried out very effectively without having to know in advance or predefine a certain dependence on certain parameters of the situation. The method is therefore not limited to predetermined situations.

A particular advantage arises from the aforementioned characteristics with regard to at least partially automated vehicles because the controllability of situations that are not known a priori, are unknown, or are partially or predominantly independent of certain parametric values is a much greater technical challenge than the controllability of known situations.

The critical situation may be characterized by the fact that it can be resolved by way of another object. In this case, it may be an (at least comparable) non-critical or not acutely critical situation. The situation is in particular a driving situation. This may include an action or interaction of the vehicle and/or the third party that has taken place, is taking place, is expected, or is in particular predicted. In addition, the situation may involve an action or interaction of the vehicle and/or the third party with other objects, wherein the situation directly or indirectly relates to the vehicle and/or the object. For example, the situation is characterized by a certain pattern, in particular detected or detectable with the method, for example a pattern of the arrangement and/or movement of affected road users, for example of the vehicle, of a third party, or of one or more objects. The method may include the detection of such a critical pattern, for example.

In particular, the critical situation is or includes a driving situation. The driving situation can be understood for example as a critical situation due to an arrangement, action, intervention or driving parameter of road users. In particular, a driving situation is characterized by a particular pattern, for example a pattern of the arrangement and speed of the road users and/or a pattern of parameters describing a situation. Also, the driving situation may be characterized by a spatial pattern of the so-called free spaces in the surroundings of the vehicle. Furthermore, the driving situation may take into account one or more parameters of the (relevant in this connection) traffic rules, for example traffic signs, right of way, traffic light phases. For example, the driving situation parameter or parameters can be based on environmental sensor data and/or information transmitted to the vehicle (for example by another road user, by way of a Car-2-Car or Car-to-X system). In this case, the environmental sensor data may be data of a surroundings sensing sensor processed in a certain way, in particular of a sensor system of at least one vehicle.

The Driving Situation May Preferably be Characterized by:

- a (certain) spatial distribution of the road users and/or the movement parameters of the road users, in particular a distribution pattern of the road users in the surroundings of the vehicle; and/or
- a (certain) spatial distribution of stationary objects in the surroundings of the vehicle; and/or
- a position and/or movement parameters relative to certain types of lane markings, traffic signs, traffic lights (not necessarily to specific traffic lights, etc.); and/or
- information about the right of way of the vehicle, in particular relative to specific road users and/or road users who are actually or at least potentially coming from certain directions, for example a crossing road from the right or from the left; and/or
- information about an action of a road user in the surroundings of the vehicle, for example exceeding a limit value, for example sounding horns, flashing lights, tailgating, overtaking the vehicle, an overtaking attempt and the like.

Preferably, the at least one driving situation may be a driving situation exceeding certain limit values, or a driving situation which is characterized by parameters exceeding certain limit values. For example, the at least one driving situation may be a driving situation with an undesirable or dangerous approach to an object or a road user, an acceleration value exceeding a limit value, an undesirable arrangement relative to other road users, etc. The driving situation can be a (for example comparatively rare) special situation or a dangerous driving situation, for example a driving situation for which an increased risk is ascertained or assumed.

In particular, the meaning of the term 'driving situation' differs from the colloquial meaning of the term 'traffic situation'. Alternatively or additionally, however, the existing traffic situation can also be ascertained and purposefully taken into account. In this case, an identifier of the traffic situation, for example, can be read out from data of a navigation system and taken into account when driving on a corresponding roadway. In a simplified case, such an identifier may correspond to certain categories; 'freely moving traffic', 'heavy traffic', 'slowly moving traffic', 'congestion', "end of traffic jam", etc.

For example, the control of the vehicle and/or of the object relative to the vehicle in a first phase, in a second phase, and/or in a third phase is carried out depending on a parameter of the situation and/or depending on a parameter of the third party. Preferably, the control is carried out in such a way that the first phase, the second phase, and/or the third phase are controlled, preferentially regulated, dynamically, i.e. during their respective execution. Particularly preferably, the control of the vehicle and/or of the object relative to the vehicle depends on a predicted parameter relating to the situation and/or the third party. For the purposes of this publication, the term "controlling" is also to be understood in particular as "regulating".

For example, the control of the vehicle and/or of the object relative to the vehicle is carried out in a first phase, in a second phase, and/or in a third phase depending on a predicted extent of the damage to a third party as a result of the possible critical situation, which is in particular only potential at this time.

For example, a parameter of the first phase, the second phase, and/or in a third phase can be implemented with a predetermined dependence on a parameter of the third party. A parameter of the third party can be a characteristic of the third party or a parameter of the movement of the third party.

For example, controlling the vehicle and/or the object can be carried out with a predetermined dependency on the so-called object classes (for example known in the method) of the third party. In particular, the contact may be carried out, not carried out or carried out and/or terminated with different parameters depending on a class of road users to which the third party belongs.

By carrying out the first phase, the second phase and/or the third phase with the vehicle and the object, an extent of risk and/or damage to the third party can be reduced, for example.

In particular, the critical situation in question, for example an imminent collision, does not directly affect the vehicle or the object. It can be a situation that affects the vehicle or the object (at most, merely) indirectly.

For example, a contact of the vehicle with the object can be controlled in such a way that damage to the third party is kept below a predetermined threshold and/or reduced, in particular minimized. In particular, a parameter of the contact is controlled in such a way that an extent of the risk or an extent of the damage to the third party is kept below a predetermined threshold and/or reduced, in particular minimized.

For example, the control of the vehicle and/or of the object relative to the vehicle can be carried out in a first phase and/or in a second phase in such a way that the ratio of the speeds or accelerations in the approach between the vehicle and the object is varied, in particular depending on the predicted parameter related to the situation and/or the third party. Preferably, in the case of a critical situation in the first phase a particularly rapid or accelerated approach between the vehicle and the object is carried out.

The approach between the vehicle and the object is to be understood in particular as a reduction in the distance between the vehicle and the object, for example in the lateral direction and/or the longitudinal direction. This can be carried out in a controlled or preferably regulated manner. Preferably, the approach between the vehicle and the object is carried out at least partially or temporarily by the (controlled or regulated) movement of the vehicle relative to the object and at least partially or temporarily by the (controlled or regulated) movement of the object relative to the vehicle.

In particular, a disproportionately rapid approach and/or a faster approach compared to the (further) approach in the second phase is to be understood as the comparatively rapid or accelerated approach between the vehicle and the object in the first phase. The slowed down approach between the vehicle and the object in the second phase is to be understood in particular as a disproportionately slow approach and/or a slower approach compared to the (previous) approach in the first phase. For example, the speed of approach in the first phase may be faster by a factor of at least 2, 5, 10, 20, 50 than in the second phase. The first phase, the second phase and/or the third phase can almost seamlessly transition between each other. Optionally, a transition condition is provided for the initiation of the first phase, for the transition from the first phase to the second phase and/or for the transition from the second phase to the third phase. In addition, one or more other conditions may be provided for aborting the third phase, for the transition to the second phase (carried out in reverse, so to speak), for the transition to the first phase (carried out in reverse, so to speak) and/or for the termination of the first phase.

The accelerated first phase can save extremely valuable time in the event of a critical situation. As a result, the execution of the action, in particular a dissipation of the kinetic energy of the vehicle, for example up to an imminent collision with a third party, can be prolonged. By extending the time, the necessary (negative) acceleration to which an occupant or a load of the vehicle is exposed during the dissipation of kinetic energy, and/or the damage resulting from the action is reduced (possibly drastically). In addition, a time interval can be increased in which a change in the critical situation can be reacted to without too much damage having to be caused by the action. For example, if the critical situation is resolved, the damage should also be avoided altogether. Since a vast majority of all critical situations (in this case independent of the vehicle) are resolved without a collision or without physical contact, there is at least statistically an extremely large reduction in damage. In other words, with an accelerated approach, more time is gained or a time reserve is gained for carrying out an action as an alternative to a physical contact and/or for decision making. In addition, the comparatively slow or slowed down second phase can essentially avoid an impact between the vehicle and the object or can reduce the risk of a heavy impact or a crash.

Preferably, recognizing or predicting the critical situation, in particular ascertaining or predicting a parameter of the critical situation, controlling the vehicle relative to the object and/or the object relative to the vehicle in the first phase, in the second phase and/or in the third phase, is carried out by a unit of the vehicle and/or of the object for performing the at least partially automated driving. For example, the control of the approach of the vehicle to the object and/or the object to the vehicle depends on the laterally arranged sensors, for example the sideways radars of the vehicle and/or the object.

Preferably, the object can be controlled in the first phase, in the second phase and/or in the third phase depending on the sensor information of the vehicle. Alternatively or additionally, the vehicle can be controlled in the first phase, in the second phase and/or in the third phase depending on the sensor information of the object.

In particular, the distance between the vehicle and the object is regulated in the first phase, for example in the lateral direction. This can be carried out by way of a control loop comprising a device (sensor, computing unit, etc.) of the vehicle and/or a device (sensor, computing unit, etc.) of the object.

Particularly preferably, the contact between the vehicle and the object is controlled, preferably regulated. In particular, the method includes carrying out the control, preferably the regulation, during the contact.

According to embodiments which can be combined with other embodiments described herein, the critical situation relates to an imminent collision of the vehicle with a collision object, wherein the object is different from the collision object For example, in this case, the collision object may be the third party, another road user or another object.

According to embodiments which can be combined with other embodiments described herein, the object is a further vehicle, in particular essentially moving in the same direction as the vehicle and/or the third party.

According to embodiments which can be combined with other embodiments described herein, the first phase, the second phase and/or the third phase are carried out depending on an operating action of the user of the vehicle and/or a unit for carrying out at least partially automated driving of the vehicle and/or a unit for carrying out at least partially automated driving of the object.

In this case, the initiation and/or execution of the one or more of the respective phases can be dependent on a recognized and/or interpreted respective action of the user of the vehicle and/or on a parameter of the unit for carrying out at least partially automated driving. For example, if the unit for carrying out at least partially automated driving does not find a (better) solution and/or cannot deal with the situation itself.

According to embodiments which can be combined with other embodiments described herein, the first phase, the second phase and/or the third phase are carried out depending on an interpretation of the operating action of the user of the vehicle, in particular a requirement for lateral guidance of the vehicle.

For example, the execution in the first phase can only take place upon a first operating action of the user. Such an operating action may be a request of the user for lateral guidance of the vehicle towards the object. This can be disproportionate or excessively strong lateral guidance towards the object compared to the user's request.

In particular, a first phase may include an approach of the vehicle to the object up to a certain first distance. After the approach, the distance can be maintained, in particular by way of appropriately established regulation. In such a case, the vehicle can be guided at least partially automatically, for example at a regulated distance of for example 20, 30, 50 cm from the object.

The first phase or the regulated state at the end of the first phase is characterized in particular by the fact that no damage must occur until then and that an (especially gentle) physical contact with the object can be immediately carried out. In other words, the vehicle and the object can be "brought into position", so to speak.

In particular, the second phase can be carried out upon a second operating action of the user. The second operating action may be an identical or similar operating action as the first operating action or another operating action defined for this. For example, the vehicle can, so to speak, wait for the repetition of the control action before the second phase and/or the third phase is initiated.

In another example, the first phase, the second phase and the third phase (one after the other, so to speak) can each be caried out upon a respective operating action or only one operating action. The sequence of phases may be carried out and/or continued if no further operator action defined for stopping or aborting the approach is carried out.

According to embodiments which can be combined with other embodiments described herein, the first phase, the second phase and/or the third phase will be terminated upon the detection or prediction of a mitigation of the critical situation relating to the vehicle and/or the at least the third party.

In an optional step, control (for example guidance, lateral guidance) of the vehicle may be terminated when a certain period of time elapses or upon an operating action of the user. For example, the lateral guidance of the vehicle and/or of the object in an approached state, changes so to speak from an "almost contact" with each other, to lateral guidance which is controlled or regulated according to another criterion. For example, the vehicle may at least partially automatically move away from the object and/or the object may at least partially automatically move away from the vehicle. The first phase, the second phase and/or the third phase may so to speak be controlled or carried out in a reverse sequence or with "reversed" parameters. In the event of a mitigation of the critical situation the control of the vehicle and/or of the object can subsequently be transferred to control depending on map information, for example a so-called high-precision map, a road marking, a vehicle ahead, or a vehicle driving behind.

According to embodiments which can be combined with other embodiments described herein, the detection of the at least one object in the surroundings of the vehicle includes ascertaining the suitability of the object for making contact and/or selecting one of at least two objects from the surroundings of the vehicle.

Advantageously, the control of the vehicle relative to the object, in particular a requirement for lateral guidance of the vehicle relative to the object, is carried out by the user of the vehicle and/or by the unit for performing at least partially automated driving, in the first phase disproportionately rapidly and/or in the second phase disproportionately slowly.

In particular, when a steering movement of the user of the vehicle occurs in a first phase it is followed by a more intensive lateral acceleration and/or lateral movement of the vehicle than would have been the case with other steering (for example without the recognition of the situation and/or the object). In this case, an approach to the object, for example to a vehicle driving in the adjacent lane, can be carried out to about 10-20 cm.

After the first phase, a further condition must be fulfilled for the initiation of the second phase and/or the third phase. For example, in the event of this further condition it can be checked whether the recognized situation, the necessity for the kinetic energy to be dissipated in sufficient proportions, (still) exists and/or no better alternative is known. Furthermore, the at least one further condition of overcoming a resistance for carrying out a further lateral movement, for example a (surmountable) steering torque on the steering wheel, can be achieved by the user. The resistance does not have to occur or be overcome at a certain steering angle, but at a certain (currently determined) distance to the object in the lateral direction. For example, if the driver (even only very roughly) moves the steering wheel towards the guard rail, it is possible (instead of a crash) to quickly move the vehicle to the guard rail or a vehicle in the adjacent lane, to take up an orientation of the vehicle essentially parallel to or at a (defined) acute angle to the guard rail and/or to make a controlled contact with the object. The process can preferably be carried out in such a way that the user, in particular the driver, no longer has to control or regulate in the course of the process, in particular shortly before and/or shortly after contact with the object. Preferably, the control or regulation of the process takes place several times per second. This means that the user does not have to select, hold or change the steering force. This could overwhelm a person in many ways (in terms of the required speed, physically or psychologically).

Optionally, however, the user of the vehicle can influence, for example determine, reduce, increase, or maximize the intensity of the process, for example a value or limit value of the lateral frictional force, before and/or during the contact of the vehicle with the object. It may be provided that the driver's steering force will not be transferred in proportion to the frictional force with the object. For example, an action of the user, for example a steering demand with a control element, towards the guard rail is implemented non-proportionally, in particular within its time duration. In the case of too strong and/or too rapid a steering demand towards the object, the steering demand of the occupant may be carried out disproportionately weakly, for example less strongly or more slowly. This can prevent an excessively acute angle with which an action of the vehicle on the guard rail takes place, which can, for example, lead to crashing, twisting or entanglement (thus also becoming wedged) of the vehicle with the guard rail.

In the case of excessively weak and/or excessively slow steering towards the guard rail (for example due to instinctive fear) (and if the user's intention is clearly identified and/or if this is decided on the basis of the situation), this can be implemented disproportionately, for example stronger and/or faster than specified.

Particularly preferably, a rapid or accelerated approach to the guard rail (caused automatically or by a steering demand) is carried out and/or a comparatively slow lateral movement relative to the object is carried out, for example to a vehicle or the guard rail located to the side.

For example, with the method, a transmission function for the torque and/or the angle from the steering wheel of the vehicle to the wheel angle and/or a transmission function for the torque and/or the angle from the wheels to the steering wheel of the vehicle is modified when approaching the guard rail and/or during the dissipation of the kinetic energy at the guard rail and/or in the event of a discontinuation or termination of the process, for example is purposefully adjusted in each case.

According to embodiments which can be combined with other embodiments described herein, in the third phase a lateral compressive force is generated at least on a point of contact between the vehicle and the object, wherein the lateral compressive force is generated according to a certain time function, in particular in defined pulses or in dynamically controllable pulses.

According to embodiments which can be combined with other embodiments described herein, the force changes once in a period of 0.1 to 0.5 seconds, preferably in a period of 0.51 to 1.0 seconds and particularly preferably in a period of 1.1 to 3 seconds.

According to embodiments which can be combined with other embodiments described herein, a system for handling a situation relating to a vehicle and/or a third party is proposed, wherein the system has a control unit which is set up to carry out the method according to one of the aforementioned embodiments.

Ideally, a crash, in particular a side crash, can be replaced by a rapid approach and then a slow "docking" and/or "rubbing instead of hitting" in a controlled manner. The two aforementioned phases of the process can be carried out as one purposefully parameterized control process or regulation process. Preferably, the lateral approach to the object, for example as a special maneuver, can be controlled depending on the data of a front and/or rear sideways radar.

As a controlled variable of the control or regulation in the approach to the object, i.e. in the first and second phases, a distance value of about 0-10 cm and/or an angular value to the object of about 0°-20°, preferably 0°-15°, more preferably 0°-5° can be selected.

With the represented technical approach of the described method an unavoidable crash can be conducted much more effectively, safely, and with less damage than a human driver ever could. In particular, a typically very brief crash with the object, rebounding or twisting of the vehicle due to the contact is avoided. This is completely or partially replaced by a controllable dissipation of kinetic energy.

For example, rubbing the vehicle against the object can be carried out as a control process. It can be a continuous, intentionally extended process that brings much less danger and damage than, a collision, for example. It can achieve a much longer duration of action of the lateral frictional force and consequently of a longitudinal counterforce, for example of 1, 2, 20, 40 or 60 seconds, than in a typical crash.

For example, the steering system and/or the braking system can be actuated, for example by control or regulation of wheel slip, in such a way that the compressive force of the vehicle on the object acts as laterally as possible (to the side of the vehicle) or at a very acute angle. The process can be extended to a longitudinal distance of 2-200 meters (depending on the length of the roadway still available or the urgency of the process). This can be carried out by actuating rear-wheel steering (towards the object) provided for this purpose.

Alternatively or additionally, activation of the wheel slip can be carried out as controlled drift on at least two wheels of the vehicle, preferably as a consequence of the approach to or contact with the object. In this case (in addition to the resulting braking force in the longitudinal direction) lateral pressing of the vehicle on the object can be carried out. An increased amount of energy can be dissipated by keeping the lateral forces from the wheels of the vehicle and a lateral counterforce resulting from the reaction of the object in equilibrium for a certain period of time. The first frictional force on the bottom of the wheels and a second frictional force on the side of the object can act rearwards simultaneously. The first frictional force and the second frictional force can in fact complement each other and result in a force (acting over the required time) opposite to the direction of movement of the vehicle.

In this case, the resulting frictional force and a total acting longitudinal counterforce may be oriented by controlling the orientation of the vehicle relative to the object and/or the compressive force of the vehicle on the object (for example in the front region and in the rear region) in such a way that the vehicle does not turn or only turns slightly during the dissipation of the kinetic energy. Thereby a very high frictional force or longitudinal force can be achieved with comparatively little damage to the vehicle and/or the object.

With the method, rebounding of the vehicle from the object and/or entanglement with the object (for example as a deformation of the object and/or the vehicle, so that the vehicle and/or the object can no longer move forward or becomes wedged) are prevented. In this case, rebounding and/or entanglement of the vehicle can take place with a preferably continuous control process or regulation process. The term "entanglement" also covers wedging.

The lateral compressive force on at least one point of contact between the vehicle and the object (for example at the front, rear and/or in the middle area) can be generated as a rapidly changing force. This can change once in 0.1; 03; 0.5; 0.8; 1.0; 1.5 or 2.3 seconds, for example. The lateral compressive force can be applied according to a defined time function, for example in defined pulses (with a certain duration and shape, for example as a "sine" function) or in dynamically controllable (preferably regulatable) pulses.

The compressive force and/or the angle of the vehicle relative to the object, in particular the temporal and/or spatial profile of the compressive force and/or the angle, can be selected or controlled in such a way that as effective a dissipation as possible of the kinetic energy takes place. At the same time, rebounding from the object and/or entanglement of the vehicle with the object can be prevented. In the event of an urgently necessary dissipation of kinetic energy (for example in the event of an imminent collision, for example at the end of a jam detected too late or a detected failure of a strictly necessary vehicle system or in the event of an accident ahead of the vehicle), the control of the compressive force and/or angle is carried out in such a way that the vehicle is driven close to the limit of the condition in which a rebound and/or entanglement (or a transition to a typical crash) occurs.

In a variant of the method, a yaw movement or a yaw force of the vehicle in relation to the object is controlled. Appropriate control or regulation can be carried out in such a way that predetermined stability criteria are not exceeded. For example, as a result much more kinetic energy can be dissipated than, for example, with a roughly constant compressive force and/or angle. A reduction of a high vehicle speed of greater than 100, 150 or 200 km/h can be achieved in this way. With the appropriate control of the compressive force and/or the angle, the friction on the object can always be kept below the threshold values at which the process develops into a crash or a strong, uncontrollable increase in force and/or spinning of the vehicle. It can be prevented that the vehicle bends the object too much, so that spinning of the vehicle (already very dangerous, possibly fatal due to the following traffic) threatens or happens. This will also prevent a (subsequently uncontrollable) increase in the acting forces and a transition to a crash.

The compressive force of the vehicle on the object can be controlled (even within several seconds, which the dissipation of the kinetic energy described herein can take) in such a way that a certain, preferably dynamically controllable, acceleration value, for example 3 g, 6 g or 9 g, exceptionally 15 g, is reached, maintained and/or not exceeded.

A significant amount of energy can be dissipated into friction instead of deformation (so-called cold deformation) of the encountering parts. For example, the compressive force can be controlled in such a way that an acceleration acting on the passenger compartment of the vehicle and/or on the occupants remains constant or essentially follows a predetermined time function (for example as a magnitude and direction). A very great advantage can also be achieved compared to a crash process, which is characterized by a brief, strong and possibly unusually adversely changing acceleration.

Preferably, the physical contact (in particular the actual "rubbing") with the object can be controlled depending on the data of a sensor (for example an accelerometer of the vehicle) and/or on a vibration or body sound in the structure of the vehicle.

The compressive force between the vehicle and the object may depend (in particular for different parts of the vehicle) on an expected or calculated, occurring or emerging deformation or destruction or loss of the parts of the vehicle (for example certain sheet metal parts).

Also, the process can be controlled depending on the detection of the occupants in the vehicle and/or their body position and seat position (body orientation, head position, fastened, not fastened and/or in the child seat, vehicle seat settings). If an occupant, for example according to the internal space sensor, is exposed to an excessively strong and therefore dangerous force, the process can be carried out less harshly or can be purposefully modified, in particular when it is already being carried out. A significant difference from an intentional or unintentional crash is the time duration of the process, for example at 2-20 seconds or longer. One or more parameters of the process can be controlled, for example adjusted, during its execution.

Also, the lateral compressive force on the object can be stronger or weaker, depending on the situation, depending on whether or not a possible collision object is detected ahead of the vehicle, or to what extent there is still a reason for the dissipation of the kinetic energy on the object.

With the method, the characteristics of the object and/or of the particular vehicle can be determined and taken into account. Subsequently, basic parameters, for example minimum, maximum or improved parameters, can be selected for carrying out the lateral and/or longitudinal contact. Preferably, such parameters can be determined from navigation data (preferably before the contact with the object).

Preferably, the structural type of the object, for example the class of the object, can be determined by way of the vehicle. The characteristics of the object can include information about the nature of different types of vehicles, for example the resilience, the tendency to elasticity or deformation.

The information about the characteristics of the object can also refer to contact with a certain type of vehicle, vehicle class (small car, large car, van, truck, semi-trailer, etc.). I.e. it can already be information that relates to or fits the vehicle or type of vehicle concerned.

In other words, the vehicle can learn about the object before a possible collision in order to then conduct the process (if necessary) as safely and effectively as possible.

In particular, the object is a guard rail. Other variants of structural separation, for example a concrete boundary, wall or curb are to be understood as a "guard rail" in the context of this publication. The method may include detection of the guard rail as such, preferably of a certain type of guard rail. Then vertically arranged parts of the guard rail (load-bearing parts, fastening bolts, cross struts or the like) and/or the height of the guard rail can be taken into account. For example, the (temporal and/or spatial) profile of a lateral compressive force can be controlled, in particular depending on the differences in the characteristics of a relevant section of the guard rail, for example a curve, bend or obstruction. This can be carried out depending on the position of vertical parts in order to limit a maximum frictional force and/or on the other hand, not to allow breakthrough and/or wedging of the vehicle with the guard rail and/or to limit an extent of damage to the vehicle, for example to a defined limit.

In a further developed variant, the parameters of the dissipation of kinetic energy to be carried out when required can be at least partly determined in advance (by way of a simulation and/or testing) for certain vehicle types or models and certain object types, for example certain guard rails, and/or various load conditions and/or speed ranges of the vehicle. These can then be applied if necessary, for example according to a look-up table.

It is preferably known whether the vehicle is operated with a trailer or is composed of at least two parts (such as a semi-trailer). Consequently, at least one feature of the method can be suppressed or modified.

For example, a (typically standardized) pattern can be detected in the ultrasonic waves or electromagnetic waves reflected by the object, for example the guard rail, (detected with an ultrasonic sensor or radar sensor of the vehicle) as a reflection pattern of a guard rail as such, or preferably as a reflection pattern of a guard rail of a certain structural type, for example according to DIN, ISO, etc. Subsequently, the dissipation of the kinetic energy can be carried out taking into account the characteristics or data of the guard rail type. The process can be carried out differently in each case on guard rails of different types of construction.

A further variant of kinetic energy dissipation is also proposed, with which the 'guard rail' is a curbstone. This can be applied if, for example, instead of a classic guard rail, a curbstone is detected. This variant of the method can be carried out in a modified form (compared to the method with a classic guard rail).

In the case of curbstones, the process may be controlled in such a way as to prevent excessive damage to the wheel of the vehicle and/or to prevent the vehicle from hitting the raised area. In an emergency, the tire and/or rim can be destroyed (in a controlled manner, layer by layer) during the dissipation of the kinetic energy. The kinetic energy of the vehicle can be dissipated very effectively. For example, with a regulated contact of the rim and the curbstone (in principle analogous to the above embodiments) in each case a very thin layer of the structure of the wheel of the vehicle can be removed.

The structure of the tire and/or the rim can be removed in a controlled manner with the method. The wheel can, so to speak, be "peeled like an orange". A rim (before its destruction) may be sufficient to dissipate or sufficiently check even a very high kinetic energy of the vehicle. Such a dissipation of kinetic energy would not be possible with the vehicle driving into the curb once. The consequences of uncontrolled driving into a curbstone (including legal consequences) would also be much more critical.

For example, if an urgent need for a dissipation of kinetic energy is detected and a curbstone can be detected, the force acting on the at least one rim upon contact with the curbstone can be controlled (in terms of amplitude and/or direction) in such a way as to prevent excessive rebounding and/or entanglement (in this case rather due to the bending of the rim). A force-essentially acting longitudinally on the vehicle-(to put it simply a frictional force or counterforce) can be maximized during this.

Figuratively speaking, the process can be compared with removal of the material on a lathe. While on the lathe as effective as possible reduction of the material layers with minimal counterforce is sought, the process according to embodiments of the invention is controlled in such a way that as large a counterforce as possible takes place with reduced material reduction.

Alternatively or additionally, a multiple, in each case very short, collision of the vehicle with the curb, followed by shutdown (in a controlled manner) is carried out. In this case, too, a very large amount of the kinetic energy of the vehicle can be dissipated (in a controlled manner).

Particularly preferred is a particular activation of the passive safety systems, depending on the execution of the steps of the method described in this publication. In particular, activation, deactivation and/or parameterization of the restraint systems (airbags, belts, etc.) can be carried out. At the very least, as a result very high costs can be saved and/or damage caused by the restraint systems themselves can be reduced or eliminated.

In this case, the triggering of the side airbags and/or a front airbag can be suppressed or modified. In particular, the side airbags may be (slowly) triggered with a low pressure or with a slow or at least two-stage increase in pressure when the kinetic energy dissipation described herein is carried out. For example, if (preferably) a rapid approach of the vehicle is carried out with a relatively gentle increase in lateral compressive force on the object, an (at least too rapid or too intensive) triggering of at least one airbag can be suppressed. This can be avoided because a blow, a crash or an uncontrollable increase in an acceleration value is not to be expected with the method. In particular, the triggering of a restraint system of the vehicle may be suppressed or modified if it is determined that the operation can be carried out without exceeding certain acceleration limits (in different directions) and below certain limits for a risk of rebounding or spinning of the vehicle.

Preferably, a second control, in particular regulation, of the movement of the vehicle is carried out after the necessary dissipation of the kinetic energy takes place. The second regulation can be carried out depending on a sensor detection of the object and/or lane markings. For example, control is carried out based on the measured value of a relative distance and/or an angle of the vehicle relative to the object at one or more points. This can be continuously detected with a front sideways radar and/or a rear sideways radar. The aforementioned values or a mathematical relationship between them can be controlled for an improved execution of the process. For example, the stability of the vehicle can thus be ensured immediately before, during and after the dissipation of the kinetic energy on the object.

For example, a reflection pattern of the (typically standardized) guard rail (for ultrasound or radar) can be recognized as such and controlled according to the recognized pattern.

For example, an approach to the object and/or the dissipation of the kinetic energy on the object and/or a reduction or termination of the dissipation of the kinetic energy on the object can be carried out depending on the relative position and/or the angle of the vehicle relative to the object and/or a roadway marking.

Preferably, orientation of the vehicle is carried out according to specified criteria (along with the termination of the contact).

For example, such a control of the forces acting on the vehicle is carried out in such a way that the vehicle is oriented away from the guard rail, for example at an angle of 5°-15, for continued travel. This can be carried out by activating the front axle steering, rear axle steering and/or wheel slip on at least one wheel of the vehicle (for example again as a controlled drift process).

The second control mentioned can be carried out, for example, by shifting the control variables from the previously predominantly significant distances and/or angles to the object to the subsequently predominantly significant distances and/or angles to at least one lane marking. In this case (at least in the meantime) an outer lane marking can also be used as a control variable.

Furthermore, for example depending on a (re-)evaluation of the situation, an orientation, a restabilization, a proportional extent of the regulation relative to the object, the guard rail and/or to a lane marking, a transition to a supported or automated lane guidance, a predefined stopping position on the guard rail and/or continued travel of the vehicle can be carried out.

A predefined (possibly suitable) safe condition of the vehicle (for the then valid situation) can be initiated. For example, the process can be performed up to a predefined speed (for example lower than a speed limit), up to a position of the vehicle relative to an object in the surroundings or until the vehicle comes to a standstill (virtually "parking at the guard rail"). Ideally, at least a supported or automated (re-)entry of the vehicle into the lane can be carried out for the continuation of travel. The onward travel can also be regarded as a "safe condition". This can be carried out after checking the free space existing in the lane.

One or more steps of the method may be carried out or controlled if one or more of the following situations are detected; in particular, the dissipation of kinetic energy at a guard rail, in particular the first phase, the second phase and/or the third phase can be carried out or controlled if one or more of the following situations are detected:

- a system of the vehicle necessary for a safe continuation of travel, for example the braking system, steering system, path planning, etc. of the vehicle fails; or it is previously determined by way of a diagnosis by way of an (active, but in itself harmless) test, for example a test braking or a steering test, that such a system will fail (with too high a probability); and/or if it is detected that the vehicle is being operated without authorization (for example is stolen) and/or is being pursued by emergency services (a chase); and/or if it is detected that the driver is falling asleep, fainting or is no longer able to control a dangerous situation or condition of the vehicle.

Particularly preferably, execution of the action (in the case of all vehicles) can be carried out upon reception of information from outside the vehicle, for example remotely; and/or depending on a certain detected or absent action of an occupant and/or depending on the detection of a certain condition of an occupant.

Particularly preferably, embodiments of the invention can be applied to automated vehicles. Also, the proposed dissipation of the kinetic energy at the guard rail is suitable for changing to a safe state in the case of uncertainty or an increasing risk associated with at least partially automated, autonomous and/or remote-controlled driving.

At least some of the action(s) described in this publication, such as a controlled approach, in particular to the guard rail, and/or control of the orientation and/or the compressive force, may be carried out and/or controlled depending on:

driving of the vehicle with a certain degree of automation and/or remote control; and/or a recognition that, in particular despite certain warnings, for example despite an urgent request to take over, no sufficient necessary takeover of a driving task by the user has taken place. For the purposes of this publication, a user is understood to mean an occupant (driver or passenger) or a user, for example a dispatcher that controls the vehicle at least partially remotely.

Particularly preferably, the dissipation of the kinetic energy can be activated or is activated from a certain degree of automation, for example from BASt-2, BASt-3, BASt-4, (if appropriate as an obligation or prerequisite for use).

At least a readiness to dissipate the kinetic energy of the vehicle at the object can be established depending on a degree of automation, for example as an activation, control, presetting of the process or receiving the data for the execution of the process.

This made it much easier to homologate the vehicles (at least for motorways, where there are standardized guard rails), for example with much lower safety requirements for one or more systems of the vehicle (braking system, steering system, chassis, drive, wheels, etc.).

In addition, it is advantageous to provide information and/or a choice for the user of the vehicle, by way of which it can be decided how to carry out dissipation of the kinetic energy on a guard rail with the vehicle (if appropriate in the event of various incidents).

Preferably, the dissipation of the kinetic energy at a guard rail can be carried out with one or more predefined measures of safety for occupants (for example acceleration limits) or the permissible damage to the vehicle and/or with the effectiveness or two or more variants of a compromise between these at least two of the measures mentioned. The required measures or a variant of a corresponding compromise may be selectable or modifiable, for example by way of settings and/or operating actions, in particular selection options. These can also be influenced or determined dynamically, situation-dependently and/or by remote control, for example by a dispatcher or from a backend.

It is particularly preferably proposed that such a (several seconds long) process is terminated or aborted depending on a check of one or more predetermined conditions. This also constitutes a difference from a crash.

For example, an action or interaction of the vehicle with the object, for example a dissipation of the kinetic energy on the vehicle and/or the guard rail can be modified and/or aborted if one of the conditions that have led to this changes (during the execution of the process). An action described in this publication, can (at least in principle) can be carried out in a reverse order and/or direction. As a result, this results in a safe and/or maneuverable position and condition of the vehicle.

Furthermore, a method for dealing with a situation relating to a vehicle and/or a third party is proposed, wherein the method includes ascertaining or predicting a particular critical situation relating to the vehicle and/or at least one third party. Further, the method includes a selection of at least one object in the surroundings of the vehicle and/or at least one third party and a selection of an action which can be carried out with the vehicle in relation to the at least one object and/or which can be carried out with the at least one object in relation to the vehicle in such a way that a extent of the damage to the vehicle, to the at least one third party and/or to the at least one object is reduced or minimized, in particular compared to potential damage resulting from the ascertained or predicted situation.

The selection (hereinafter also referred to as "selection") of the object can be carried out, for example, according to an in particular dynamic prioritization of the objects. For example, several objects are selected by way of a decision matrix and/or an optimization function depending on the determined information. For example, a resulting effectiveness and/or consequence for different objects and/or parameters can be realized. The ascertained or predicted situation may give rise to an imminent collision of the vehicle with a third party, wherein the object is different from the third party and/or is essentially uninvolved in the situation or not threatened by the situation.

The object may be a further vehicle, in particular in the surroundings and for example moving on a neighboring lane or a cross road, and/or a part of an infrastructure device. For example, the infrastructure device is actuated, for example by way of an actuator, to change a physical property or to carry out a movement.

Advantageously, the object is another vehicle, in particular moving substantially in the same direction.

For example, it can be ascertained and taken into account with the method whether the vehicle and/or the object and/or the third party is being driven automatically or is capable of automated driving, or whether it contains occupants or how many occupants it contains or a respective collision-relevant parameters can be determined.

If, for example, a collision of the vehicle with a third party essentially in the direction of travel is imminent, the selection of at least one object from several detected objects from the surroundings of the vehicle can be made according to a predetermined dependence. The selection of the object can be made, for example, according to an especially dynamic prioritization of the objects. For example, several objects can be selected by way of a decision matrix and/or an optimization function depending on the determined information. For example, a resulting effectiveness and/or consequence for different objects and/or parameters can be realized. Subsequently, an approach of the vehicle to the object and/or an approach of the object to the vehicle and/or contact with the object is carried out substantially obliquely to the direction of travel of the vehicle.

For Example, the Following can be Determined and Taken into Account as a Qualitative and/or Quantitative Measure:

- an effectiveness with regard to mitigating the imminent collision, in particular the reduction of the probability and/or of a consequence of the imminent collision; and/or
- an effectiveness with regard to the dissipation of the kinetic energy of the vehicle by way of the object; and/or
- a consequence of a contact with the object, in particular necessary for the sufficient dissipation of the kinetic energy.

Then the selection of the at least one object and/or at least a parameter of the first phase, a parameter of the second phase and/or of the contact with the object takes place, depending on the information ascertained.

They can be (mutually) alternative or mutually exclusive objects and/or actions, in particular types of actions, and/or variants of objects and actions.

Advantageously, for the selected action, which can be carried out with the vehicle in relation to the at least one object and/or which can be carried out with the at least one object in relation to the vehicle, a parameter is determined or adjusted in such a way that a extent of the damage to the vehicle, to the at least one third party and/or to the at least one object is reduced or minimized, in particular compared to potential damage which would result from the ascertained or predicted situation.

Advantageously, the action is selected from a number of possible actions, which includes at least the following actions:

- dissipation of the kinetic energy of the vehicle, in particular stopping the vehicle, by physical contact, in particular friction, with the at least one object;
- modification of the movement trajectory of the vehicle by physical contact with the at least one object, in particular by the effect of the at least one object;
- controlling, in particular regulating, the longitudinal guidance of the vehicle and/or the at least one object, wherein a selection of a point of contact between the vehicle and the at least one object to be carried out for a substantially lateral to the direction of movement of the vehicle and/or of the at least one object;
- controlling, in particular regulating, an approach of the vehicle to the at least one object and/or of the at least one object to the vehicle, in particular causing lateral guidance of the vehicle to the at least one object and/or of the at least one object to the vehicle;
- the contact of the vehicle with the at least one object is carried out;
- orientation of the vehicle by a physical contact with the at least one object, in particular by the effect of the at least one object, wherein the orientation is carried out relative to a direction of travel and/or to a lane marking and/or to the at least one third party and/or by the at least one third party;
- forcing the vehicle by way of the at least one object onto another object, in particular another vehicle or a guard rail;
- driving the vehicle out by way of an action by the at least one object, in particular by way of a collision caused by the at least one object; preferably, the driving out is effected by an object controlled transversely to the direction of movement of the vehicle.
- driving the vehicle out of a dangerous position, for example from an intersection, in particular if the vehicle is in danger or at least potentially endangers a third party;
- carrying out a collision of the vehicle and/or the at least one object, in particular controlled and/or calculated in advance, for the benefit of the at least one third party;
- controlling the vehicle relative to the object in such a way that in a first phase an in particular accelerated approach to the object is carried out, in a second phase an in particular slowed down approach to the object is carried out and in a third phase a contact with the object is carried out.

In other words, the method can include a selection of one of the described actions, in particular interactions. This may be carried out depending on the ascertained or predicted parameters of the situation and/or on a predicted extent of the disadvantage and/or on an extent of the advantage.

In this case, the at least one parameter of the one or more of the actions described, in particular interactions, can be determined and/or adjusted during the execution of these actions, once or preferably several times, so that damage to the third party is reduced and/or an advantage for the third party is enhanced.

When controlling the approach of the object to the vehicle, a controlled, in particular regulated lateral guidance of the object to the vehicle, in particular causing a lateral guidance of the vehicle to the object and/or of the object to the vehicle can be carried out even during the physical contact.

The direction of movement before the occurrence or recognition of the situation is to be understood in particular as the (respective) direction of movement. For example, the object can be (pre)accelerated or pre)decelerated, in particular relative to its previous movement or movement planning, in such a way that a suitable contact point for the vehicle and/or the object, in particular corresponding to an increased advantage and/or reduced disadvantage, is made achievable.

The one or more actions that can be performed with the vehicle in relation to the object and/or with the object in relation to the vehicle can be divided into certain types of actions. These types of action may be distinguished by specific patterns. For example, a type of action is characterized by a specific pattern, in particular recognized or recognizable with the method, for example a pattern of the arrangement and/or the movement of involved road users, and/or distinguishable from other types of action. The method may involve a distinction between such patterns and/or a decision for one of several patterns, which are in particular mutually alternative or mutually completing and/or mutually exclusive.

For example, the method may include a selection of one of the actions or interactions described. This may be carried out depending on the ascertained or predicted parameter of the situation and/or on a predicted extent of the disadvantage and/or extent of the advantage.

In this case, the at least one parameter of the one or more of the described actions or interactions can be determined and/or adjusted during the execution of these actions once, preferably several times, in such a way that damage to the third party is reduced and/or an advantage for the third party is increased. This can also be carried in particular if a third party is able to drive into the vehicle.

Advantageously, several of the possible actions are compared with each other and the action is selected that causes the least damage to the vehicle, to the least one third party and/or to the at least one object, in particular compared to the potential damage that would result from the ascertained or predicted situation.

Advantageously, the selection of the at least one object in the surroundings of the vehicle and/or of the at least one third party and the selection of an action which can be carried out with the vehicle in relation to the at least one object and/or which can be carried out with the at least one object in relation to the vehicle, is carried out before the specified situation, in particular exceeding a certain degree of criticality, occurs or has occurred.

For example, the selection of the one or more objects in the surroundings of the vehicle and/or of the at least one third party and the selection of an action that can be carried out with the vehicle in relation to the at least one object and/or with the at least one object in relation to the vehicle, in the normal, ongoing driving mode, is controlled in particular cyclically and/or based on a predetermined condition. The corresponding data, characterizing at least one selected object and/or a type of the action or an action may be stored and/or updated, in particular continuously. This can be carried out by way of a step of the method, for example controlled by a predetermined condition. Alternatively, this can be carried out by way of a suitably set up memory area, in particular a ring buffer.

The condition for carrying out one or more of the steps described may be an increase in a risk, wherein the risk is significantly lower than a risk for which an action is to be carried out. Only upon recognizing the at least one defined situation and/or a situation exceeding a certain degree of criticality can the action be carried out with the object, in particular depending on the stored data.

In other words, with the method according to embodiments of the invention an "opportunity for a mistake" is continuously sought without a critical situation existing. Advantageously, then, in the event of a typically short-term occurrence of a certain situation also exceeding a certain degree of criticality, the data are already present. For example, comparatively complex or slowly executable steps or parts of the steps of the method are carried out in advance and/or when the risk is still low. Only as a result of this is resource saving possible.

Advantageously, the selection of an action and/or the determination or adjustment of a parameter of the action, which can be carried out with the vehicle in relation to the at least one object and/or which can be carried out with the at least one object in relation to the vehicle, is carried out depending on an operating action of a user of the vehicle and/or of a user of the at least one object, wherein in particular the operating action of the user of the vehicle and/or of the user of the at least one object and/or a lack of an objection to the action are characteristic of an agreement with the action.

The operating action of the user of the vehicle and/or of the user of the object can also be carried out from a distance, for example by remote control. For example, an operator or dispatcher of an at least partially autonomously driving object, for example a truck without occupants, carries out the operating action from a distance, so to speak by remote control. For example, the action or interaction of the vehicle and/or of the object can be carried out thereafter or only thereafter.

In particular, with the method an interpretation of an action of the user of the vehicle may be carried out in particular with regard to the lateral guidance of the vehicle. For example, an object can be actuated or controlled in a direction specified by a user with a steering handle (steering wheel, joystick, etc.). For example, an action of the user may be (disproportionately) strengthened and/or accelerated and/or attenuated and/or slowed down with regard to its execution. For example, a relative velocity of the approach to the object can be accelerated and slowed down at the moment of physical contact.

The agreement with and/or lack of objection to the action of the user of the vehicle and/or of the user of the object may consist, for example, in the fact that no operating action by the driver, user or dispatcher prevents the action or objects to the action.

For example, the initiation and/or execution of one or more of the phases of an action or interaction can be carried out depending on, in particular only in the event of, a respective action of the vehicle user being detected and/or interpreted, and/or is carried out depending on a parameter of the unit for carrying out at least partially automated driving.

Advantageously, in the event of the action with which the vehicle is steered to the object in such a way that in a first phase an in particular accelerated approach to the object is carried out, in a second phase an in particular slowed down approach to the Object is carried out, and a third phase contact with the object is carried out, the first phase, the second phase and/or the third phase are carried out depending on the operating action of the user of the vehicle and/or on a unit for carrying out at least partially automated driving.

Advantageously, the selection of an action which can be carried out with the vehicle in relation to the at least one object and/or with the at least one object in relation to the vehicle is carried out depending on a response of the at least one object to a request sent in particular from the at least one third party and/or from the vehicle and/or from an infrastructure device.

For example, the request may be an SOS call of the vehicle, of the object and/or of the infrastructure device. For example, objects are preferred that agree to carry out at least one action. In this case, a risk can be taken that can be calculated better.

Advantageously, an Extent of a Disadvantage and/or an Extent of an Advantage are Predicted:

- in relation to the ascertained or predicted situation without performing at least one action;
- for at least two of the objects from the surroundings of the vehicle and/or from the surroundings of the at least one third party;
- for at least two of the actions, in particular actions involving different objects;
- for one or more variants of the actions, in particular different types of the actions and/or actions with different objects;
- in relation to a comparison of the extent of the disadvantage and/or of the extent of the advantage ascertained in each case;
- in relation to the selection of the at least one object in the surroundings of the vehicle and/or of at least one third party and the selection of an action, which can be carried out with the vehicle in relation to the at least one object and/or with the at least one object in relation to the vehicle;
- in relation to determining or adjusting a parameter of an action depending on information ascertained.

Advantageously, the determined or adapted parameter is controlled or regulated during the execution of the action, in particular during the physical contact between the vehicle and the at least one object.

A parameter of the longitudinal guidance of the vehicle and/or of the object can be controlled or regulated. A parameter of the lateral guidance of the vehicle and/or of the object can be controlled or regulated. In particular, a parameter of the lateral guidance of the vehicle and/or of the object can be controlled or regulated in a defined dependence on the parameter of the lateral guidance of the vehicle and/or of the object.

For the Invention Described Above with its Embodiments, the Following Bullet Point Advantages Result:

- a solution for several problems that have not yet been solved (within the vehicle), especially in highly automated driving (HAD);
- cases could be solved that could otherwise derail the entire business model of automated driving.
- a lower damage record;
- saving lives;
- competitive advantage for the operator of such vehicles;
- a HAD vehicle can (contrary to its reputation) even rescue uninvolved third parties;
- rubbing and/or docking instead of hitting;
- in contrast to a crash, the sequence of the action or actions is (dynamically) controllable;
- also application at high speed is possible;
- saves a dangerous and expensive triggering of airbags or other restraint systems;
- safety for the operation of the functions of automated and/or remotely controlled vehicles;
- as a result, conceivable future legal requirements or homologation criteria for automated and/or remotely controlled vehicles can be fulfilled;
- enormous cost savings, if lower safety requirements (for example ASIL or the like) for safety-relevant expensive vehicle components for HAD result;
- controllability for vehicles operated without authorization, vehicles and/or users which are out of control;
- a safe condition of the vehicle, if appropriate restabilization and/or continuation of travel are possible;
- addressing public concerns about automated vehicles.

In another example, the object can be the vehicle and the vehicle can be the object.

Further advantages, features and details of the invention result from the following description of preferred exemplary embodiments and based on the drawing. The features and combinations of features mentioned above in the description as well as the features and combinations of features mentioned below in the FIGURE description and/or shown in the FIGURES alone can be used not only in the respective specified combination, but also in other combinations or on their own without departing from the scope of the invention.

The invention is described below by way of exemplary embodiments and using the attached drawings.

DETAILED DESCRIPTION OF EXEMPLARY EMBODIMENTS OF THE INVENTION

Figures 1A, 1B, 1C, 1D:
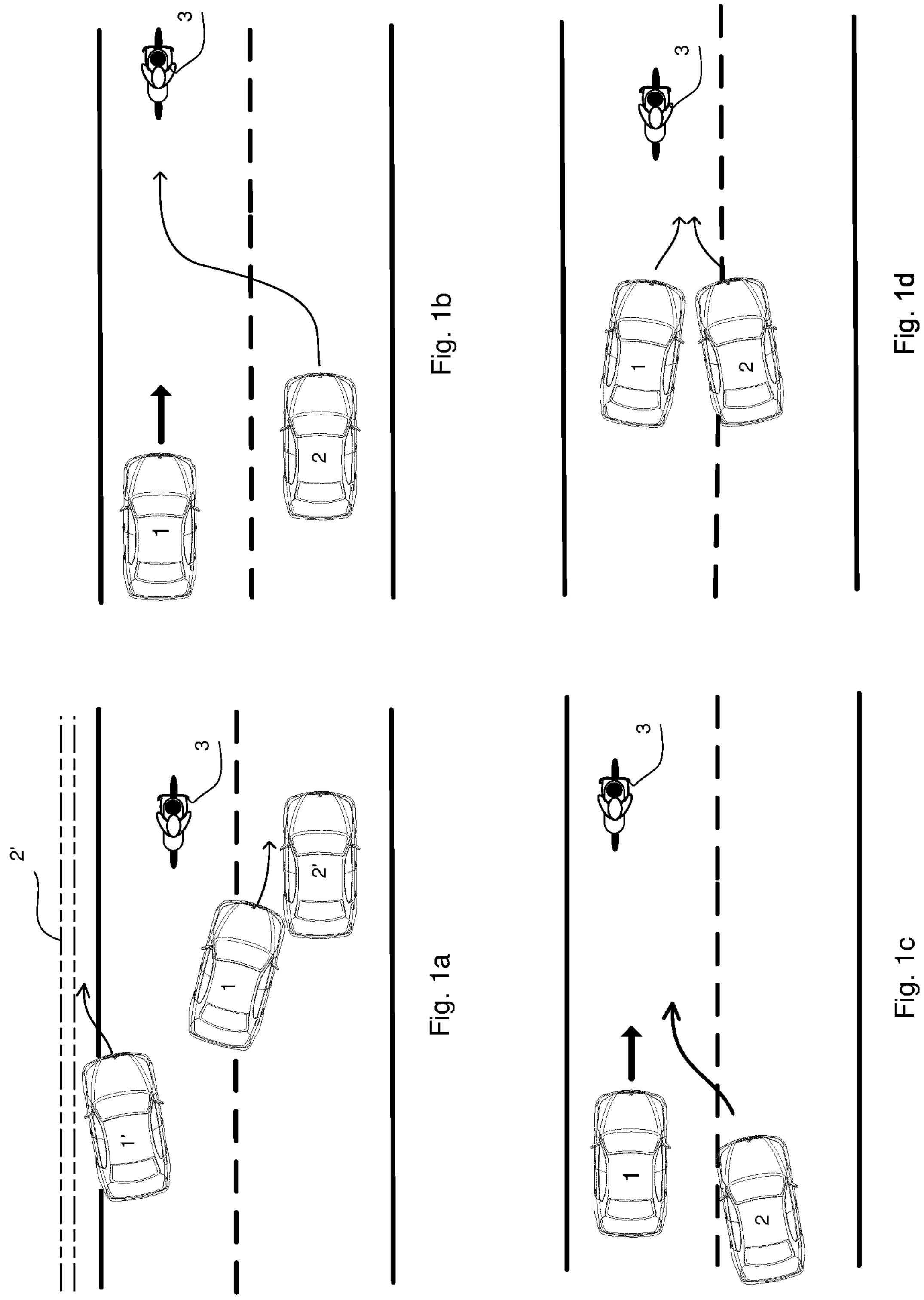
FIGS. 1*a*-1*d* show schematically partial steps of the method for handling a situation relating to a vehicle and/or a third party.

FIG. 1*a* shows a situation possibly leading to a crash for three different vehicles 1, 1' and 2 as well as a motorcycle 3. A guard rail is denoted by 2'.

At least vehicles 1 and 2 are automated vehicles. For automated vehicles, the method described is particularly advantageous because such vehicles can have certain effects that are otherwise difficult to control, and because the user (in certain cases) is not in the vehicle at all, is not ready to drive, or is not responsive.

In order to control the movement of the vehicle 1, in particular to reduce its speed faster than braking allows (with a maximum possible 0.9 m/s$^2$), an object 2, 2' is selected. This is carried out in order to reduce the damage to the motorcycle 3, which is particularly endangered in this specific situation. In doing so, a controllable, in particular regulatable, interaction with a guard rail 2' and/or with the vehicle 2 is precalculated and automatically compared.

The selection of the object 2, 2' depends on whether there is a suitable data connection and/or whether an automatic agreement with the automated vehicle 2 is successful.

The method can alternatively be carried out without a predicted collision, for example if the automated vehicle 1 gets a technical problem and/or the driver does not take over control of the vehicle and/or an important sensor fails.

FIG. 1*b* describes a possibility of how a critical situation of the vehicle 1 and/or a possible danger to a third party 3 from the vehicle 1 can be detected or predicted by way of the vehicle 2. In other words, the vehicle 2 may detect and/or predict a problem of vehicles 1 and/or 3. The planning of the movement or the movement of the vehicle 2 is modified (for example controlled or regulated) in order to mitigate the situation, in particular to reduce an extent of damage and/or to increase the extent of the advantage (for example the chance of survival and/or the freedom of action for the third party).

In the situation shown in FIG. 1*b*, vehicle 2 changes lanes to drive or to cut in in front of vehicle 1, in particular between vehicle 1 and the motorcycle 3. For example, vehicle 2 accelerates to overtake vehicle 1. Then vehicle 2 cuts in to drive in front of vehicle 1. Then vehicle 2 brakes, in particular in such a way that the distance to vehicle 1 is changed first rapidly and then slowly to prevent a crash. This is followed by in particular regulated braking of vehicle 2, during which vehicle 1 is also “rescued”, so to speak.

Particularly preferably, the braking performance of vehicle 2 is controlled or regulated in such a way, in particular divided across at least two of the wheels of vehicle 2, so that the movement of vehicle 1 can be held within certain limits. In other words, the object 2 can balance the “docked” vehicle 1, so to speak. Its movement (instead of uncontrolled) can be at least partially controlled or co-controlled by vehicle 2.

FIG. 1*c* describes the situation in which vehicle 1 and/or the motorcycle 3 are detected or predicted. Subsequently, (in particular only) vehicle 2 is caused to stop, orient and/or control vehicle 1. In this case, vehicle 2 may be caused to stop, orient and/or control vehicle 1, in particular by way of a corresponding signal from vehicle 1, from the motorcycle 3, from an infrastructure device (for example from a motorway bridge), and/or by its own devices (sensors, computing unit). Alternatively or additionally, this may be used to protect the motorcycle 3 (as a “bodyguard”, so to speak).

In particular, vehicle 2 may be a vehicle without occupants or an empty moving vehicle. Thus, human casualties can be avoided.

In a further example (not shown), vehicle 2 can push vehicle 1, in particular in a controlled or regulated manner, to the guard rail 2'.

In the situations described in FIGS. 1*b* and 1*c*, vehicle 1, effectively the vehicle that has the problem or has caused the problem or is about to cause a problem, does not in itself have to be an automated vehicle. It can be a normal manually drivable vehicle, a currently non-automated vehicle or a vehicle affected by a problem (for example an out of control automated vehicle). For example, vehicle 2 can be used to control (solve, mitigate, reduce consequences of) a problem of other road users, for example of vehicle 1 and/or the motorcycle 3, in particular a problem between these road users. In particular, vehicle 2 is not directly affected by the detected or predicted situation.

In the situation presented in FIG. 1*d*, vehicles 1 and 2 can be brought into an in particular essentially lateral contact. In this case, vehicle 1 can be stopped, oriented and/or controlled particularly quickly. In other words, vehicles 1 and 2 may perform a snow plough FIGURE, in particular in a coordinated manner (with each other and/or by way of an infrastructure device).

This may also be the case in the event of at least partial inability to drive of the human driver (if any), failure of the sensors, processing unit and/or other devices of vehicle 1. For example, control of vehicle 1 by vehicle 2, control of vehicle 2 by vehicle 1, and/or control of vehicle 1 and/or vehicle 2 by an infrastructure device (for example the backend and/or a device comprising a sensor on a highway bridge, etc.) can be carried out.

The invention claimed is:

1. A method for handling a situation relating to a vehicle and/or at least one third party, the method comprising:

ascertaining or predicting a critical situation relating to the vehicle and/or the at least one third party;

detecting at least one object in surroundings of the vehicle and/or of the at least one third party; and controlling the vehicle and/or the at least one third party relative to the at least one object or controlling the at least one object relative to the vehicle and/or the at least one third party, in an ordered sequence, such that:

in a first phase, by the controlling, a comparatively rapid or accelerated approach as a reduction in distance between the vehicle and/or the at least one third party and the at least one object is carried out, in a second phase, by the controlling, a comparatively slow or slowed down approach as a reduction in distance between the vehicle and/or the at least one third party and the at least one object is carried out, and in a third phase, by the controlling, a contact between the vehicle and/or the at least one third party and the at least one object is carried out, wherein:

in the third phase, by the controlling, the vehicle is laterally guided toward the at least one object and a lateral compressive force is applied on at least one contact point between the vehicle and the at least one object, the lateral compressive force is applied in defined pulses or in dynamically controllable pulses, and the critical situation is characterized by a probability of damage and/or an extent of damage exceeding a threshold.

2. The method as claimed in claim 1, wherein the critical situation relates to an imminent collision of the vehicle with a collision object and the at least one object is different from the collision object.

3. The method as claimed in claim 1, wherein the at least one object is a further vehicle.

4. The method as claimed in claim 3, wherein the further vehicle is moving in substantially a same direction as the vehicle and/or the at least one third party.

5. The method as claimed in claim 1, wherein the first phase, the second phase and/or the third phase are carried out depending on an operating action of a user of the vehicle and/or a unit for carrying out at least partially automated driving of the vehicle and/or a unit for carrying out at least partially automated driving of the at least one object.

6. The method as claimed in claim 5, wherein the first phase, the second phase and/or the third phase are carried out depending on an interpretation of the operating action of the user of the vehicle.

7. The method as claimed in claim 6, wherein the operating action is a requirement for lateral guidance of the vehicle.

8. The method as claimed in claim 1, wherein the first phase, the second phase and/or the third phase are carried out upon detection or prediction of a mitigation of the critical situation relating to the vehicle and/or the at least one third party.

9. The method as claimed in claim 1, wherein detecting the at least one object in the surroundings of the vehicle includes a determination of suitability of the at least one object for carrying out a contact and/or a selection of one of at least two objects from the surroundings of the vehicle.

10. The method as claimed in claim 1, wherein the lateral compressive force changes once in a period of 0.1 to 0.5 seconds.

11. The method as claimed in claim 1, wherein the lateral compressive force changes once in a period of 0.51 to 1.0 seconds.

12. The method as claimed in claim 1, wherein the lateral compressive force changes once in a period of 1.1 to 3 seconds.

* * * * *